United States Patent [19]

Morihara et al.

[11] Patent Number: 4,773,917
[45] Date of Patent: Sep. 27, 1988

[54] COAL GASIFIER

[75] Inventors: Atsushi Morihara; Syuntaro Koyama, both of Katsuta; Mitsuhiro Matsuo; Hiroshi Miyadera, both of Hitachi; Jinichi Tomuro, Katsuta; Shunsuke Nogita, Hitachi; Yoshiki Noguchi, Hitachi; Yukio Hishinuma, Hitachi, all of Japan

[73] Assignees: Babcock-Hitachi Kabushiki Kaisha; Hitachi Ltd., both of Tokyo, Japan

[21] Appl. No.: 908,907

[22] Filed: Sep. 18, 1986

Related U.S. Application Data

[63] Continuation of Ser. No. 594,210, Mar. 28, 1984, abandoned.

[30] Foreign Application Priority Data

Mar. 28, 1983 [JP] Japan .................. 58-50496

[51] Int. Cl.$^4$ .............................................. C10J 3/48
[52] U.S. Cl. ......................................... 48/77; 48/63; 48/76; 48/DIG. 4
[58] Field of Search ............ 48/63, 76, 77, DIG. 4, 48/73, 69, 206, 203, DIG. 2, 64

[56] References Cited

U.S. PATENT DOCUMENTS

| 2,388,348 | 11/1945 | Stinson ..................... 48/DIG. 4 |
| 2,644,745 | 7/1953 | Hemminger .................... 48/63 |
| 2,739,878 | 3/1956 | Jolley ........................ 48/21 |
| 4,168,956 | 9/1979 | Blaskowski .................. 48/210 |
| 4,209,304 | 6/1980 | Kessler et al. ............... 48/202 |

FOREIGN PATENT DOCUMENTS

| 2749303 | 5/1978 | Fed. Rep. of Germany ........ 48/203 |
| 3623714 | 12/1936 | Japan . |
| 57-200492 | 8/1982 | Japan . |

OTHER PUBLICATIONS

Young, "Recent Developments in High Pressure, Entrained Flow, Slagging Gasification of Coal," 8th Int. Conf. on Coal Gasif., Univ. of Pittsburgh, Aug. 4–6, 1981.

Primary Examiner—Peter Kratz
Attorney, Agent, or Firm—Antonelli, Terry & Wands

[57] ABSTRACT

An entrained bed coal gasifier constructed so as to conduct two-stage reactions in a single gasification zone can be operated with high gasification efficiency by feeding coal and a gasifying agent through upper burners located at an upper portion from the half of the gasification section along the vertical direction and lower burners located at a lower portion from the half of the gasification section so as to make rotational flow respectively, the ratio of the amount of gasifying agent to the amount of coal at lower burners being larger than that of at the upper burners, the rotating circle diameter formed by the coal and gasifying agent injected from the upper burner being larger than that formed by the lower burner.

2 Claims, 8 Drawing Sheets

CONSTRICTION RATIO 0.5
SAME ROTATIONAL
CIRCLE

CONSTRICTION RATIO 0.5
DIFFERENT ROTATIONAL
CIRCLE

COAL GASIFIER

This application is a continuation application Ser. No. 594,210 filed Mar. 28, 1984 now abandoned.

BACKGROUND OF THE INVENTION

This invention relates to an improvement of an entrained bed coal gasifier.

There are various types of coal gasifiers such as fixed bed, fluidized-bed, entrained bed, and the like, these being under development. The gasifiers are required to have various performance such as (a) the gasification efficiency is high; (b) the operational control is easy, (c) no pollutive substance is produced, (d) coal throughput capacity per one gasifier is large, (e) various types and ranks of coal can be treated, and (f) the reliability is high and the life is long. The entrained bed gasifier is highly expected to satisfy totally the above-mentioned requirements compared with other types of gasifiers.

According to an entrained bed coal gasification process, pulverized coal usually having a particle size of 100 μm or less is fed through a burner to a gasifier, wherein the coal is reacted at a melting point of coal ash or higher by a gasifying agent (e.g. oxygen, air, steam, and the like). As a result, gases rich in hydrogen and carbon monoxide can be obtained by the following reactions:

$$Coal \rightarrow Char\ (C, H) + H_2 + CO + CH_4 \quad (1)$$

$$C + O_2 \rightarrow CO_2 \quad (2)$$

$$C + \tfrac{1}{2}O_2 \rightarrow CO \quad (3)$$

$$H_2 + \tfrac{1}{2}O_2 \rightarrow H_2O \quad (4)$$

$$CH_4 + \tfrac{1}{2}O_2 \rightarrow 2H_2 + CO \quad (5)$$

$$C + CO_2 \rightarrow 2CO \quad (6)$$

$$C + H_2O \rightarrow CO + H_2 \quad (7)$$

In order to meet the above-mentioned requirements (a) through (f), there are various types of entrained bed gasifiers, which can be classified as mentioned below from the viewpoints of (I) reaction types, (II) burner arrangement, and (III) whole gasifier structures.

(I) REACTION TYPES

(i) One-Stage Reaction Process

A gasifying agent and pulverized coal are reacted under a constant mixing ratio $\alpha$. For example, the Texaco process (U.S. Pat. No. 4,209,304), the Boliden Aktiebolag process (Japanese Patent Appln Kokai (Laid-Open) No. 200492/82), the Shell process, and the Toyo-Koatsu process (Japanese Patent Appln Kokai (Laid-Open) No. 23714/61).

(ii) Two-Stage Reaction Process

There are formed two or more reaction regions by gasifing the coal with different mixing ratios ($\alpha$) of a gasifying agent and coal. For example, the Combustion Engineering (C-E) process (U.S. Pat. No. 4,168,956).

Alternatively, pyrolysis of coal represented by the reaction formula (1) and a partial oxidatio reaction represented by the reaction formula (3) are proceeded simultaneously. For example, the Bi-Gas process ("Recent Development in High Pressure, Entrained Flow, Slagging Gasification of Coal" by R. K. Young in 8th International Conference on Coal Gasification, Liquefaction & Conversion to Electricity: University of Pittsburgh, Pittsburgh, Pa., Aug. 4–6, 1981).

(II) BURNER ARRANGEMENT

(i) Single Burner Type

One coal feed burner is located in a gasifier either vertically downwardly or upwardly. For example, the Texaco process.

(ii) Multi-Opposed Burner Type

Opposed burner pairs are located horizontally. For example, the Shell process.

(iii) Multi-Tangentially Directed Burner Type

Tangentially directed burners are located on the same horizontal level at circumferential spaced points and cause voltex flow in a gasifier. For example, the C-E process, the Boliden Aktiebolag process and the Toyo-Koatsu process.

(III) GASIFIER STRUCTURE

(i) Single Gasification Zone Type

The reaction of (I) mentioned above is conducted in one reaction zone of the gasifier. For example, the Texaco process.

(ii) Multi Gasification Zone Type

The reaction of (I) mentioned above is conducted in two or more gasification zones divided by narrowed shapes or dividers. For example, the C-E process, and the Bi-Gas process.

The gasification processes can be classified as mentioned above. Typical gasifiers used therefor can be constructed by the following combinations:

(A) One-stage reaction/Single burner/Single gasification zone.

(B) One-stage reaction/Multi-opposed burners/Single gasification zone.

(C) One-stage reaction/Multi-tangentially directed burners/Single gasification zone.

(D) Two-stage reactions/Multi-tangentially directed burners/Multi gasification zones.

The above-mentioned type gasifiers (A) to (D) have individual features as well as problems. For example, in the case of (A), the gasifier structure is simple and the operational control is easy, but there are some problems in the scale up, gasification efficiency and the operation at the partial load.

In the case of (B), there are advantages in that flames collide each other to prevent gasifier walls from damages by the high-temperature flames, the structure is comparatively compact and can increase the throughput capacity. But, there are problems in that there is a tendency to make the structure more complicated, and the scale up is difficult.

In the case of (C), there are advantages in that the residence time of coal particles can be increased by rotational motion cased by the voltex flow, and since molten ash is easily adhered to gasifier walls, the amount of coal ash recovered as slag, not fly ash, can be increased. In order to strengthen the rotational force, it is sufficient to enlarge the circumferential angle. But, if the circumferential angle becomes too large, the flame directly collides at a gasifier wall to easily damage the wall material. Thus, there are suitable conditions for the angle of burners and the number of burners, which results in making the range of operational conditions narrower.

The above-mentioned cases belong to the one-stage reaction process. Problems common to these cases are that the type of coal to be treated and the range of suitable operational conditions are comparatively narrow and it is difficult to maintain high gasification efficiency under wide conditions. According to the above-mentioned Boliden Aktiebolag process and Toyo Kaotsu process, a burner injecting only a gasifying agent is located at a place different from other burners for injecting coal. In these processes, a gasifying agent is fed to improve the flow and removal of molten slag and to enlarge the stable operational range. But the secondary gasifying agent increases the rate of heat loss due to high temperature of the gasifier wall. Further, since the secondarily fed gasifying agent easily reacts with a combustible gas produced, it does not react with coal or char particles positively. Therefore, the secondary feed of gasifying agent may be good for making the temperature higher but hardly contributes to the improvement of gasification efficiency.

Generally speaking, the most strongly influencing factor on the gasification efficiency in the entrained bed gasifier is the ratio ($\alpha$) of the feed amount (kg) of gasifying agent to the feed amount (kg) of coal. When the structure of gasifier and the value of $\alpha$ are determined, the gasification efficiency, the gas composition produced and the temperature of gasifier can almost be determined. Further, since the gasifier is operated by selecting a proper $\alpha$ value so as to obtain the desired gasification efficiency and gasification temperature, the type of coal to be treated and operational conditions are limited to some extent. The two-stage reaction process is devised so as to remove the problems mentioned above.

That is, in the case of (D), two or more $\alpha$ values are selected and the reactions are carried out in different gasification zones employing individual $\alpha$ values. According to the (D) type gasifier, the degree of freedom for selecting the type of coal and the operation conditions becomes higher compared with the gasifiers of (A) to (C). Usually, a higher gasification efficiency and a higher temperature can be obtained in the reaction region with a large $\alpha$ value, but in the reaction region with a small $\alpha$ value, the gasification efficiency is low, particles (char) containing unreacted carbon are retained and fly out from the gasifier together with the produced gases. Thus, it is necessary to recover the char and to return the char to the region having a higher $\alpha$ value again for gasification. Such a char recycle process requires additional equipments such as a hopper, valves, a feeder, a char flow detector, and the like, which results in making the apparatus, the structure and the operation more complicated.

As mentioned above, the prior art technique concerning entrained bed gasification has a disadvantage either in the gasification efficiency or in the operation properties and reliability and thus cannot satisfy all the requirements (a) through (f) mentioned above.

SUMMARY OF THE INVENTION

It is an object of this invention to provide a gasifier which can improve the gasification efficiency, and make the operation control easy and the reliability high.

This invention provides a coal gasifier comprising a gasification zone, a gas outlet having a diameter which makes the sectional area smaller than that of the horizontal sectional area of the gasification zone at an upper portion of the gasification zone, a slag tap hole at the bottom of the gasification zone, and at least two installed positions of feed burners at different heights, an upper burner or burners being located at an upper portion from the half of the gasification zone along the vertical direction, and a lower burner or burners being located at a lower portion from the half of the gasification zone, whereby coal and a gasifying agent is injected by the same burner into upper and lower portions of the gasification zone, the ratio $\alpha$ at the lower portion being larger than that of the upper portion.

DESCRIPTION OF THE PREFERRED EMBODIMENTS

Figure 1:
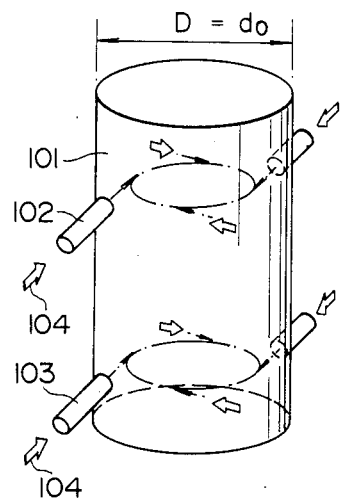
FIGS. 1 and 2 are schematic illustrations of model gasifiers.

The gasifier of this invention does not belong to any of the gasifiers of (A) through (D) mentioned above, but belongs to a new one, that is, (E) Two-stage reaction process/Multi-tangentially directed burners/Single gasification zone.

In this invention, since the two-stage reactions take place together in a single gasification zone, the structure is simpler than that of (D), the heat can be utilized effectively and the gasification efficiency can easily be improved.

In the gasifier of this invention, the reactions of the reaction formulae (1) and (3) take place in the upper portion of the gasifier and the reactions of the reaction formulae (2) and (3) take place in the lower portion of the gasifier. In the upper portion, the amount of oxygen is decreased to produce char which is reactive, and in the lower portion, the amount of oxygen is increased to react the coal in a very short time (to produce gases rich in $CO_2$ and $H_2O$) and at the same time, the reactivity of char produced during the reactions can be improved compared with the case not distributing the coal, which results in accelerating the reactions of the reaction formulae (6) and (7) mentioned above. The process using the gasifier of this invention is characterized by distributing the coal for reaction, followed by effective contact of reactive char with gases enriched with a $CO_2$, $H_2O$, etc.

The gasifier of this invention can take a structure having a constriction at the gas outlet. Differences in gasification between the case of not distributing coal and the case of distributing coal are mentioned below.

Even in the case of gasification without distributing coal (gasification with one $\alpha$ value), there is the above-mentioned fundamental difference between the one-stage reaction process and the two-stage reaction process. In addition, the following fundamental differences are revealed.

When the gasification is carried out without distributing coal with one $\alpha$ value, the reaction steps can be traced with regard to coal particles as follows: coal particles first fly into the gasification zone at high temperatures and then are decomposed thermally to produce char. The gases produced by pyrolysis react with oxygen to raise the temperature of char. The char is then ignited to start the gasification of char. The char is initially gasified with oxygen by the reaction formulae (2) and (4) mainly, while the temperature of char itself is also raised. After the reaction (2) and (4) are finished, the char is gasified with the gases produced by the reaction formulae (2) and (4), expressed by the reaction formulae (6) and (7), and $H_2$ and CO are mainly produced. During these steps, since the reactions with oxygen represented by the reaction formulae (2) and (4) are so fast that the total gasification rate depends predominantly on the reaction rate of the reaction formulae (6) and (7). Therefore, it becomes important how to increase the reaction rate of the reaction formulae (6) and (7) in order to improve the gasification efficiency.

In this case physical properties of char greatly influence the reaction rate. That is, when the temperature of char reach at the melting point of the ash, the char becomes dense to make the diffusion rate of gases into the core of particle slow and much more time is required to complete the reactions. That is, the reactivity is lowered. Thus, the char flies out of the gasifier while retaining unreacted carbon therein. In the one-stage reaction, it is inevitable to follow the reaction steps of pyrolysis→burning of char→rising of the char temperature→lowering in char reactivity, and thus it is difficult to raise the gasification efficiency.

In contrast, when coal is fed dividedly and is gasified under different $\alpha$ values, the reactions proceed by the following steps.

In the upper portion, the gasification is conducted with a small $\alpha$ value. In such a case, since the amount of oxygen is small, the char present in the reaction step is not heated to the melting point of the ash, and further since the surface of char is rich in functional groups, the char is very reactive.

On the other hand, in the lower portion, the gasification is conducted with a large $\alpha$ value and the char becomes dense. But since the amount of oxygen is large, the diffusion rate of gases into the core of char particle is not lowered. Therefore, the coal fed to the lower portions is completely gasified at a very short time. The gases produced in the lower portion rich in $CO_2$ and $H_2O$ contact with the char produced in the upper portion and the reactions represented by the reaction formulae (6) and (7) proceed faster than the above-mentioned one-stage reaction type. The ash in the char is melted after almost all the carbon in the char particle is gasified.

So, the carbon loss as in the case of the one-stage reaction process is very little.

As a result of totaling the upper and lower portion reactions, the two-stage reaction process in this invention is superior to the one-stage reaction process in the reaction rate and thus it is easy to improve the gasification efficiency.

The important thing in the two-stage reaction process is to contact the char produced in the upper portion with the high-temperature gases produced in the lower portion sufficiently, and preferably to increase the residence time of coal fed to the upper portion. In order to attain such objects, it is important to investigate the movement of coal particles in the gasifier.

In the next place, the movement of coal particles and gases in the invented gasifier is explained below.

Figure 2A:
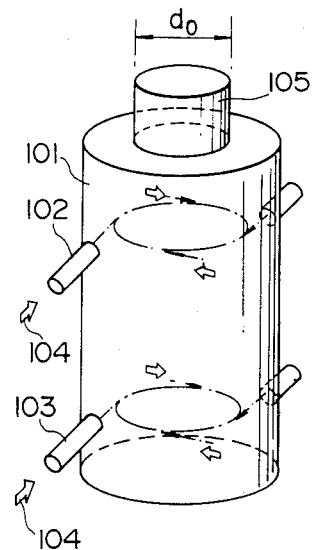
Figure 2B:
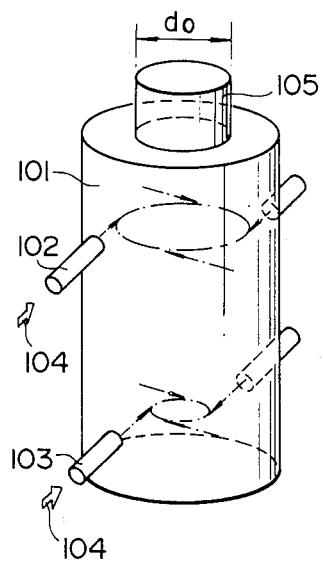

FIG. 1 and FIGS. 2(a) and (b) are examples of model gasifiers used for experiment. Numeral 101 denotes a model gasifier made from a transparent resin, numeral 102 upper burners and numeral 103 lower burners, with 4 burners, respectively. Air 104 is passed through each burner and at the same time a small amount of pulverized coal is fed intermittently (pulse-wise) through one burner of either the upper or lower burners to measure a time for reaching the outlet of the model gasifier 101 by using a continuous dust measuring equipment. In FIG. 1, the ratio of the diameter $d_0$ of the gas outlet to the diameter D of the gasifier is 1 ($d_0 = D$) (hereinafter this ratio $d_0/D$ is defined as "constriction ratio"), and the diameter of an inscribed circle of the straight lines drawn from the upper burners 102 toward the coal injecting direction (hereinafter referred to as "rotational circle diameter") is equal to the rotational circle diameter of the lower burners 103 (hereinafter this case is defined as "the same rotational circle diameter type"). FIG. 2(a) shows the case belonging to the same rotational circle diameter type but the gas outlet diameter ($d_0$) is narrowed to form the outlet 105 and to make the constriction ratio $d_0/D < 1$ (hereinafter this case is defined as "the same rotational circle diameter with narrowed outlet type"). FIG. 2(b) shows the case wherein the narrowed outlet 105 with the constriction ratio $d_0/D < 1$ is employed and the rotational circle diameter of the upper burners 102 and the rotational circle diameter of the lower burners 103 are different (hereinafter this case is defined as "different rotational circle diameter with narrowed outlet type").

Figure 3:
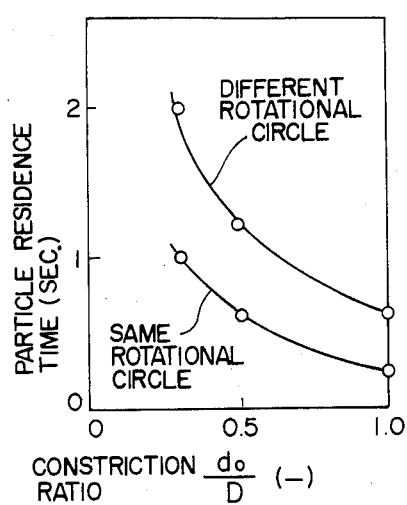
FIG. 3 is a graph showing a residence time of particles in the gasifiers shown in FIGS. 1 and 2.

FIG. 3 is a graph showing a relationship between the residence time ($\theta$s) of coal particles and the constriction ratio ($d_0/D$) when coal particles are fed throuth an upper burner 102 while passing air at normal temperatures using the model gasifiers of FIGS. 1, 2(a), and 2(b) in order to study influences of the structure of gasifiers. As is clear from FIG. 3, when the outlet of gas is narrowed more and more (i.e. the $d_0/D$ ratio becomes smaller), the residence time ($\theta$s) becomes longer. Further, when the constriction ratio is the same, the residence time ($\theta$s) becomes longer in the case of the different rotational circle diameter compared with the same rotational circle diameter.

Figure 4:
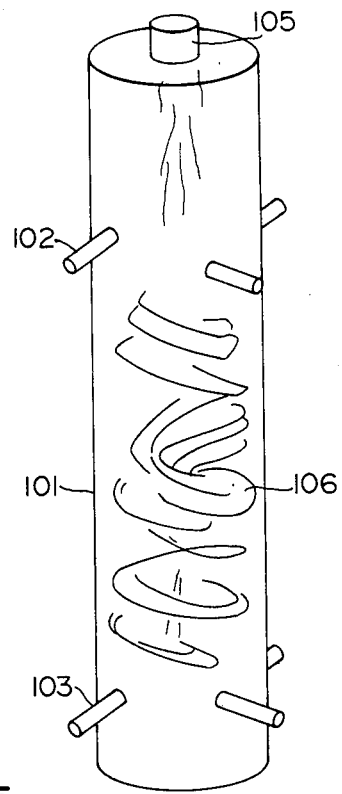
FIG. 4 is a drawing illustrating the stream line of particles in the gasifier of FIG. 2.

FIG. 4 shows the stream lines of coal particles in a different rotational circle diameter with narrow outlet type gasifier. The coal particles fed through an upper burner 102 flow down with rotational moving (the formation of downward rotational flow 106), but the stream is reversed at some place to remove the coal particles out of the outlet at the upper portion. One major reason for increasing the residence time ($\theta s$) in the different rotational circle diameter with narrowed outlet type gasifier is the remarkable formation of the downward rotational flow. The downward rotational flow is formed by the following principle.

The movement of particles in the entrained bed gasifier is easily influenced by the flow of gases. On one hand, the flow of gases depends on the distribution of pressure P. When a rotational flow is formed in the gasifier, the pressure distribution at the radius direction (r) is determined by the distribution of tangential velocity ($V_\theta$) and represented by the following equation:

$$\frac{1}{\rho} \frac{\partial P}{\partial r} = \frac{1}{R} V_\theta^2 \tag{8}$$

wherein $\rho$ is the density of gases, R is a radius of the gasifier and P is a pressure.

Figure 5:
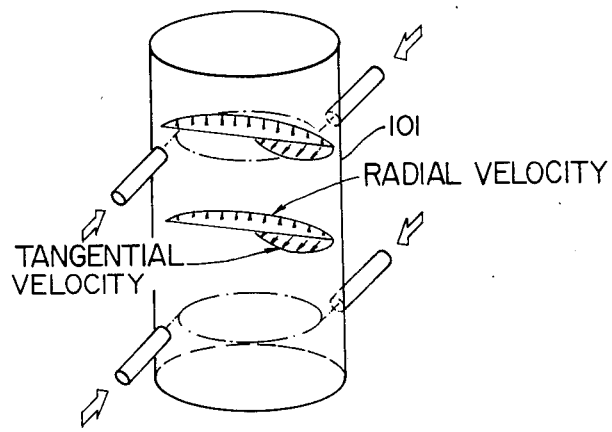
FIG. 5 is a drawing illustrating gas velocity distributions in a model gasifier.
Figure 6:
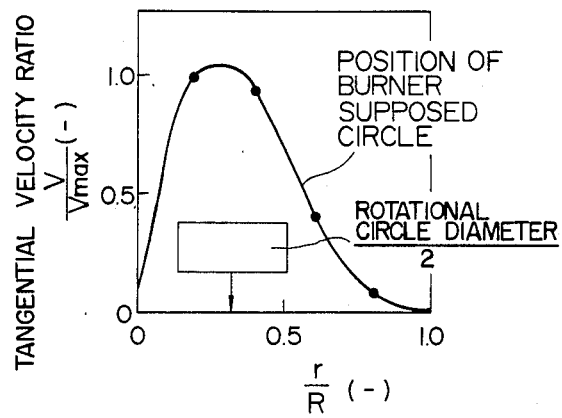
FIG. 6 is a graph showing a distribution of circumferential velocity at the radius direction.

FIG. 5 is one example of the distribution of gas velocities in a model gasifier 101. The gas velocity can be represented by the sum of velocity component of vectors at the axial direction, at the tangential direction and at the radial direction. In FIG. 5, the velocity component of a vector at the radius direction is not shown. FIG. 6 is a graph showing the distribution state of the tangential velocity ($V_\theta$) at the radius direction. The most important thing in this case is that $V_\theta$ becomes maximum at $r \approx$ rotational circle diameter and becomes zero at the walls and the center of the gasifier. In other words, if the injection conditions from the burners are constant, the distribution of $V_\theta$ at the radium direction can be determined to some extent by the burner rotational circle diameter. Further, the pressure distribution at the radius direction can be determined by the equation (8), wherein the pressure gradient becomes maximum at near the burner rotational circle diameter taking the maximum $V_\theta$.

Figure 7:
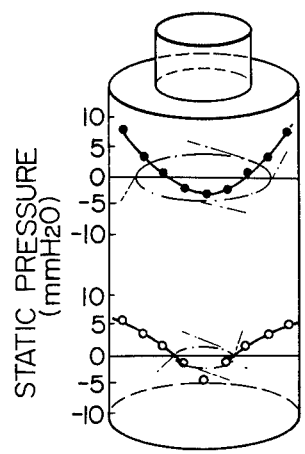
FIG. 7 is a drawing illustrating static pressure distributions in a model gasifier.
Figure 8A:
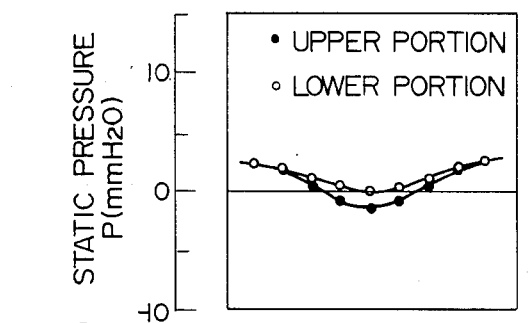
FIG. 8 is graphs showing differential pressures and static pressures at radius direction positions.
Figure 8B:
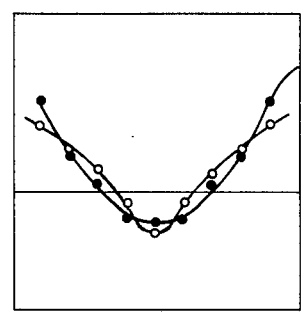
Figure 8B:
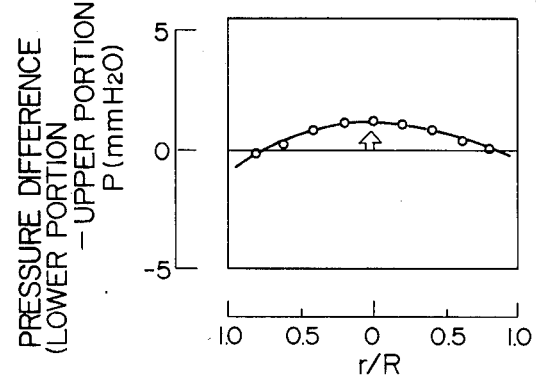
Figure 8B:
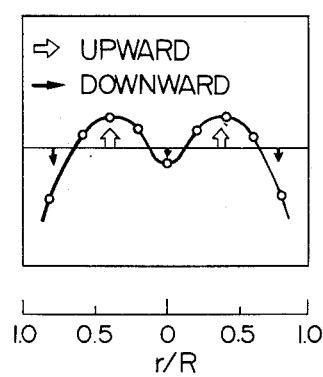

On the other hand, the pressure distribution at the vertical direction is investigated in order to make clear the gas flow at the vertical direction. FIG. 7 is one example showing pressure distributions in a model gasifier 101. In order to compare pressure distributions at two different heights, differences of pressures at the lower and upper portions are shown in FIGS. 8(a) and 8(b). FIG. 8(a) shows the same rotational circle diameter with narrowed outlet type and FIG. 8(b) shows the different rotational circle diameter with narrowed outlet type. In FIG. 8(a), the pressure difference between the lower and upper portions is always positive at all the radii. That is, since the pressure at the lower portion is higher than that at the upper portion, the gases always flow from the lower portion to the upper portion. On the other band, in FIG. 8(b), the differential pressure becomes negative at the center and walls of the gasifier. That is, the pressure at the lower portion is lower than that at the upper portion. These mean that the upward stream is always formed in the model gasifier 101 as shown in FIG. 8(a) and the downward stream is partially formed as shown in FIG. 8(b). Therefore, in order to form the downward stream of coal particles positively, the pressure distribution as shown in FIG. 8(b) is preferable.

In order to make the pressure difference at the vertical direction partly positive and partly negative, it is necessary to cross the distribution curves (that is, the curve•—•and the curve∘—∘are crossed) at the upper and lower portions as shown in FIG. 8(b). If the distribution curves are not crossed as shown in FIG. 8(a), the pressure difference is always positive and no downward stream is formed. As mentioned above, the pressure distribution at some height is determined by the tangential velocity distribution, which is controlled by the burner rotational circle diameter. Therefore, by changing the rotational circle diameters at the upper and lower portions, the pressure distribution curves crossing at the upper and lower portions can easily be obtained and the downward rotational flow can easily be formed.

According to the above-mentioned principle, when the different rotational circle diameter with narrowed outlet type gasifier rather than the same rotational circle diameter with narrowed outlet type gasifier is used, coal particles fed through the upper burners move to the lower portion of the gasifier accompanied by the down stream, followed by flying out of the gasifier, so that the residence time can further be increased while contacting with gases sufficiently.

Figure 9:
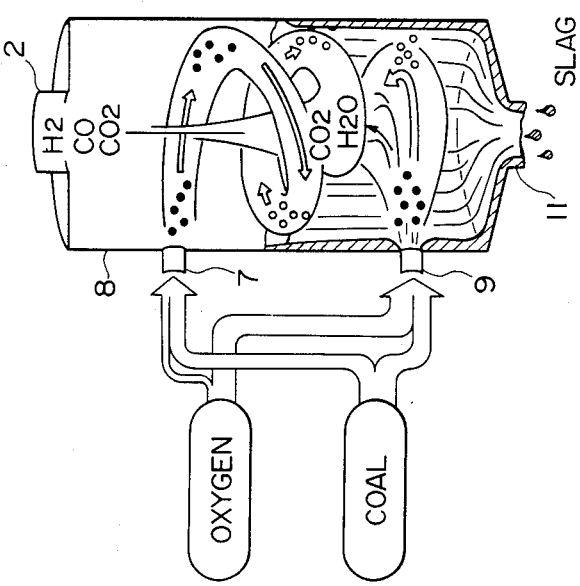
FIG. 9 is a schematic illustration of a gasifier according to this invention.
Figure 10:
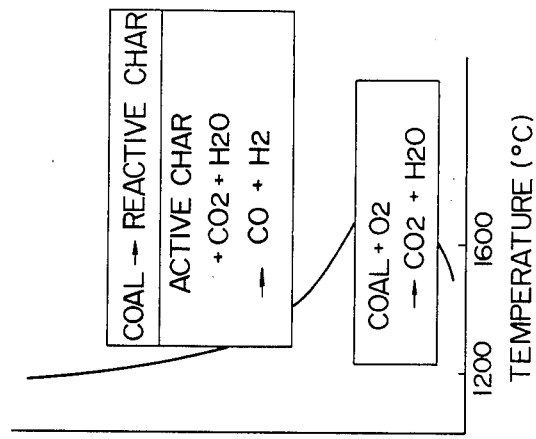
FIG. 10 is a graph showing a temperature distribution and gasfication reactions in the gasifier of FIG. 9.

The gist of this invention is explained referring to FIGS. 9 and 10. FIG. 9 is a schematic illustration of the gasifier according to this invention, and FIG. 10 is a graph showing a temperature distribution, and typical gasification reactions in the gasifier of FIG. 9. At the upper portion of the gasification section 8, there is formed a gas outlet 2 having a diameter which makes the sectional area smaller than that of the horizontal sectional area of the gasification section 8, and at the bottom of the gasification section, there is formed a slag tap hole 11 having the smaller diameter as the gas outlet 2. At the upper and lower portions of the gasification section 8, there are provided burners 7 and 9 for injecting the coal and gasifying agent. The rotational circle diameter of mixed fluid injected from the upper burner 7 at the upper portion of the gasification section 8 is made larger than that of injected from the lower burner 9 at the lower portion of the gasification section 8. Further, the proportion of the gasifying agent to coal fed from the lower burner 9 is made larger that fed from the upper burner 7. Therefore, char is produced at the upper portion of the gasifier and gases rich in $CO_2$ and $H_2O$ are produced at the lower portion of the gasifier. The char produced at the upper portion moves downward accompanied by the downward rotational flow. Since the coal is gasified under conditions of a small oxygen content, the resulting char becomes remarkably porous and is rich in reactivity. The char thus produced reacts with the high-temperature gases rich in $CO_2$ and $H_2O$ produced by the lower burner 9 so as to produce gases rich in CO and $H_2$, which are taken out of the gas outlet 2. After the reaction, the ash becomes molten slag, which is taken out of the slag tap hole 11.

Figure 11:
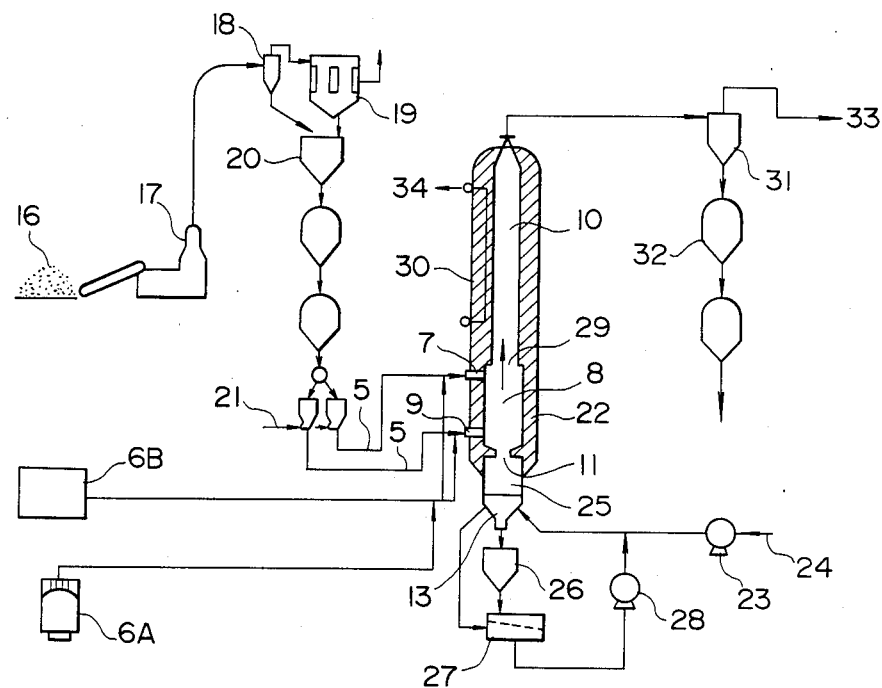
FIG. 11 is a flow diagram wherein the gasifier of this invention is used.

The gasifier having the construction as mentioned above can be used in industrial coal gasification, for example, in a flow diagram as shown in FIG. 11. In FIG. 11, coal 16 is pulverized by a crasher 17, and then transported by a gas (e.g. air, nitrogen), received by a cyclone 18 and a bag filter 19 and stored in a hopper 20. The thus stored pulverized coal is sent to an upper portion and a lower portion of the gasification section 8 of the gasifier 22 by a feed gas 21 (e.g. nitrogen, carbon dioxide, air, a part of the produced gases, etc.). In the gasification section 8, a mixed fluid containing pulverized coal 5, oxygen 6A, and steam 6B, the latter two becoming gasifying agents, is injected through the upper burner 7, and another mixed fluid containing pulverized coal 5 oxygen 6A and steam 6B is injected through the lower burner 9. The proportion of the gasifying agent to the pulverized coal 5 is larger in the mixed fluid injected from the lower burner 9 than in the mixed fluid injected from the upper burner 7. The pulverized coal is gasified in the gasification section 8 according to the reactions shown in FIGS. 9 and 10. The coal ash is melted to become slag, which flows down along the gasifier walls and the slag tap hole 11 and drops into a water tank 13. In the water tank 13, the slag is cooled by cooling water 24 sent by a pump 23 with pressing at a slag cooling portion 25 and stored in a slag hopper 26. Then, the slag is separated by a slag separator 27 and disposed. The cooling water used for cooling the slag is used again via a recycling pump 28. The water tank 13 can be maintained at a low temperature by recycling the water and there can be prevented the vaporization of water caused by temperature rise by radiation heat and heat transfer from the gasifier and sensible heat of the slag. The produced gases 29 are passed through a heat recovering portion 10, wherein the heat is recovered by a heat exchanger 30. The char in the produced gases is caught by a cyclone 31 and is stored in a char hopper 32. Since this char is sufficiently gasified in the gasifier 22, the content of unreacted carbon is so small that it is not necessary to be gasified again in the gasifier 22 as in a conventional process. The produced gases 33 leaving the cyclone 31 are passed through a heat recovery apparatus and a gas purification apparatus (both being not shown in the drawing) and used as synthesis gas, a source of hydrogen, and fuel for industries and power plants. The heat exchanger 30 in the gasifier 22 is usually used for generating steam 34, which is used for producing electric power.

Figure 12:
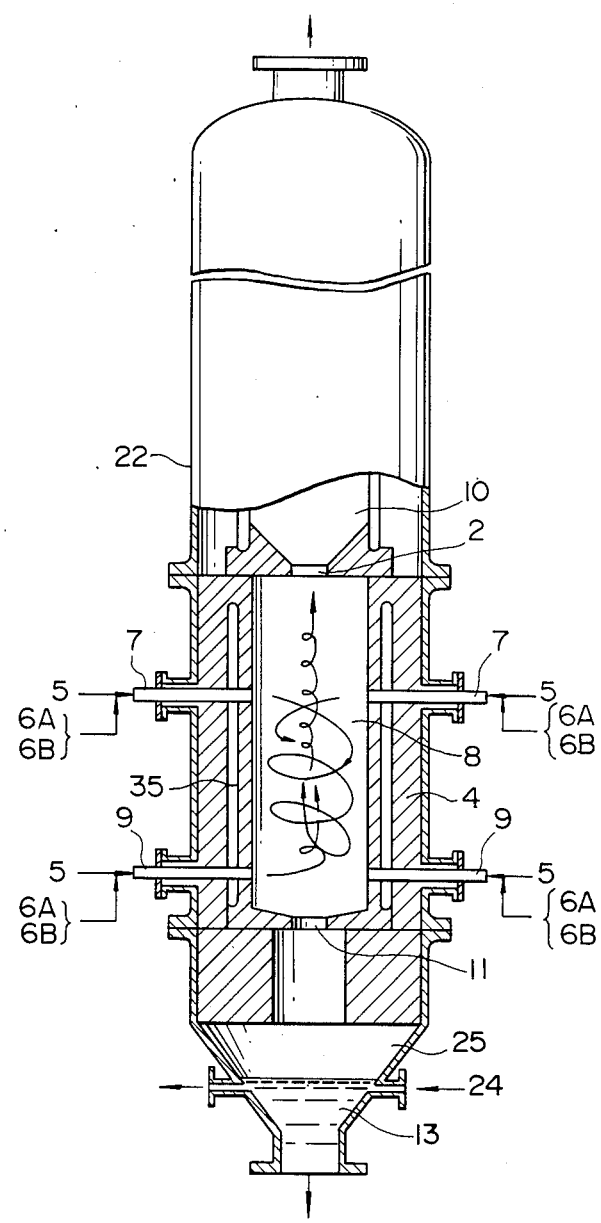
FIG. 12 is a lengthwise cross-sectional view of essential portions of one example of the gasifier of this invention.

FIG. 12 is a lengthwise cross-sectional view of essential portions of the gasifier 22. In FIG. 12, the upper portion of the gasification section 8 is connected to the heat recovery portion 10 via the gas outlet 2 and the lower portion is connected to the slag cooling portion 25 via the slag tap hole 11. The whole body of the gasifier 22 is covered by a heat insulating material 4, which can be cooled by a water cooling pipe 35 buried therein in order to prevent the inner walls of the gasifier from damages caused by high-temperature gases and molten slag and to stop the damages at a certain depth of the covering. Each sectional area of the gas outlet 2 and the slag tap hole 11 is formed smallar than that of the gasification section 8. The burners 7 and 9 are located at the upper and lower portions of the gasification section 8, more in detail, the upper burners 7 are located at an upper portion from the half of the gasification section 8 along the vertical direction and the lower burners 9 are located at a lower portion from the half of the gasification section 8 along the vertical direction.

Figure 13:
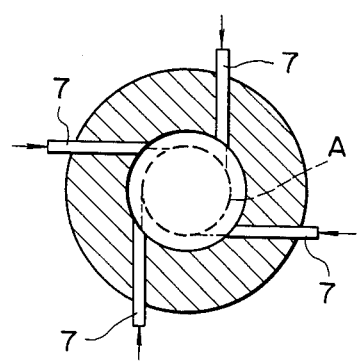
FIGS. 13 and 14 are horizontal cross-sectional views of upper and lower burners of FIG. 12.
Figure 14:
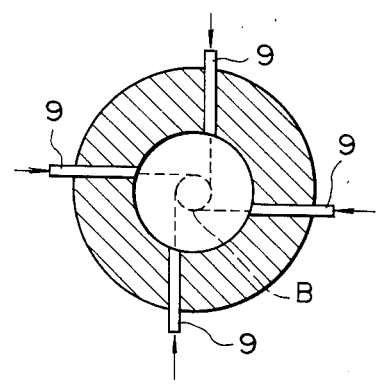

FIGS. 13 and 14 are horizontal cross-sectional views of the burners 7 and 9. The upper burners 7 in a total number of 4 are located at the direction contacting with the rotational circle A. The lower burners 9 in a total number of 4 are located at the direction contacting with the rotational circle B which has a smaller diameter than the rotational circle A. It is possible to form the rotational flow with three burners from the viewpoint of geometry. But in order to maintain the rotational flow to some extent even when the balance between the coal and the gasifying agent from individual burners is lost or the load is changed, it is preferable to use at least 4 burners at the same horizontal level. When the number of burners is increased, the stability for forming the rotational flow is increased, but the operation and control of the gasifier becomes undesirably complicated and reliability of stable coal feed is lowered. Therefore, it is not preferable to increase the number of burners more than that required in order to prevent the above mentioned disadvantages. But when the gasifier becomes very large, since the magnitude of burner flame against the diameter of gasifier becomes smaller relatively, it is necessary to enlarge the coal injecting velocity from the burner or to increase the number of burners in order to maintain a constant tangential velocity.

In this invention, since the amount of gasifying agent fed to the upper portion of the gasification section 8 is smaller that fed to the lower portion, the temperature near the upper portion is lower than that of the lower portion. Therefore the rotational circle diameter A formed by the upper burners 7 can be made larger than that formed in the one-stage burner method of prior art ($\frac{1}{2}$ to $\frac{2}{3}$ of the diameter of gasifier). When the ratio of oxygen amount/coal amount fed to the upper burners 7 is in the range of 0 to 0.65 kg/kg, the rotational circle diameter A can be enlarged to 0.7 to 0.8 of the gasifier diameter with almost no damages on the walls of gasifier. When the ratio of the rotational circle diameter A to the gasifier diameter is more than 0.8, the sides of flames contact with the gasifier walls or the influence of friction with the gasifier walls becomes remarkable, so that no rotational flow is formed along the rotational circle A due to confusion of the gas flow.

Figure 15:
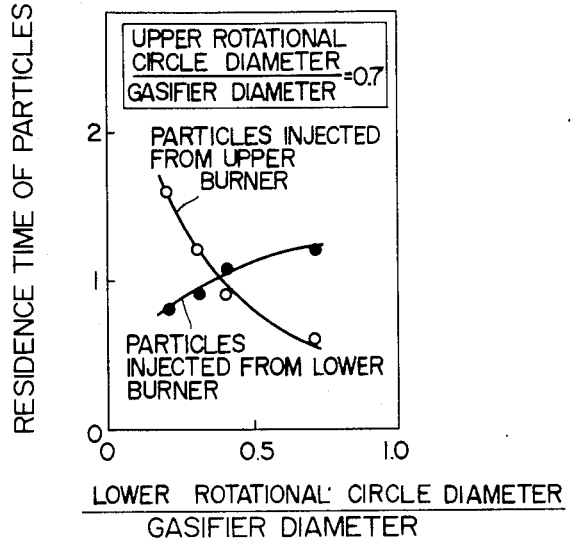
FIG. 15 is a graph illustrating a residence time of particles used in the gasifier of FIG. 12.

The rotational diameter B formed by the lower burners 9 can be determined from the standpoint of an increasing effect of residence time of coal particles injected from the upper burners 7. The results of measuring the residence time of coal particles for determining the lower portion rotational circle diameter are shown in FIG. 15. The residence time of the particles injected from the upper burners 7 becomes longer when the rotational circle diameter of lower portion becomes smaller, but in contrast the residence time of the particles injected from the lower burners 9 becomes shorter when the lower portion rotational circle diameter becomes smaller. On the other hand, when the rotational circle diameter becomes too small, rotational flow is not formed.

As mentioned above, since the amount of gasifying agent fed to the upper portion of the gasification section 8 is smaller than that fed to the lower portion, the reaction time at the lower portion can be short. The ratio of oxygen amount/coal amount fed to the upper portion of the gasification section 8 is in the range of 0/1.0 to 0.65/1.0 kg/kg, while said ratio at the lower portion is 0.9/1.0 to 1.6/1.0 kg/kg. Consequently, the time for complete gasification under the conditions of lower portion becomes $\frac{1}{2}$ to 1/7 of the time for gasification time of upper portion. In FIG. 15, even if the ratio of the lower portion rotational circle diameter to gasifier diameter is about 0.2, the ratio of residence time of particles in the lower portion to that in the upper portion is 1:2. Thus, when the residence time of particles in the upper portion is satisfactory, the residence time of particles in the lower portion is sufficiently satisfactory. But when the lower rotational circle diameter becomes too small, no rotational flow is formed, so that the particles rise up which results in making the residence time of particles fed to the lower portion insufficient. Therefore, the lower portion rotational circle diameter should be determined from the conditions for forming the rotational flow and 0.2 to 0.3 of the inner diameter of the gasifier is preferable. That is, the lower portion rotational circle diameter is most preferably 0.25 to 0.4 of the upper portion rotational circle diameter.

Another important meaning for making the lower portion rotational circle diameter smaller than the upper portion rotational circle diameter is to prevent the gasifier walls from the flames. Since the gasification is conducted by feeding oxygen and coal so as to make the ratio of oxygen amount/coal amount fed through the lower burners 9 larger than that fed through the upper burners 7, the flame temperature becomes remarkably high. Under such circumstances, if the rotational circle diameter is determined from the viewpoint of only strengthening centrifugal force of coal particles, the rotational circle diameter would be large and the gasifier walls would be exposed to the high-temperature flames. But when the rotational circle diameter is made small according to this invention, there is no such a fear. Even if the oxygen amount is increased, the gasifier can be operated safely.

This invention is illustrated by way of the following Examples.

EXAMPLES 1 AND 2 AND COMPARATIVE EXAMPLE 1

Gasification was carried out by using the gasifier 22 with narrowed outlet shown in FIG. 12 and changing the arrangement of upper burners 7 ("upper" in Table 1) and lower burners 9 ("lower" in Table 1) under the conditions shown in Table 1. In Example 1, the two-stage reaction process of the same rotational circle diameter was used and in Example 2, the two-stage reaction process of different rotational circle diameter was used. For comparison, the one-stage reaction process gasifier was used. The ratio of total oxygen/total coal was 0.903 in all Examples 1 and 2 and Comparative Example 1. The ratio of oxygen/coal at the lower burner was 1.2 in

EXAMPLES 1 AND 2

The results are shown in Table 1.

As is clear from Table 1, higher efficiency is obtained in the two-stage reaction process compared with the one-stage reaction process, and in the different rotational circle diameter type compared with the same rotational circle diameter type.

TABLE 1

| | Example No. | | |
|---|---|---|---|
| | Comparative Example 1 | Example 1 | Example 2 |
| | | Process | |
| | One-stage reaction | Two-stage reaction | |
| Coal feed rate (kg/hr) | | | |
| upper | 0 | 9.7 | 9.7 |
| lower | 19.7 | 10.0 | 10.0 |
| Oxygen feed rate (kg/hr) | | | |
| upper | 0 | 5.8 | 5.8 |
| lower | 17.8 | 12.0 | 12.0 |
| Rotational circle diameter / Gasifier diameter (m/m) | | | |

TABLE 1-continued

| | Example No. | | |
|---|---|---|---|
| | Comparative Example 1 | Example 1 | Example 2 |
| | | Process | |
| | One-stage reaction | Two-stage reaction | |
| upper | — | 0.5 | 0.7 |
| lower | 0.5 | 0.5 | 0.3 |
| Composition of produced gases (vol, %) (free from $N_2$, $H_2O$) | | | |
| $H_2$ | 33.4 | 33.0 | 32.0 |
| CO | 50.3 | 52.0 | 56.4 |
| $CH_4$ | 0.1 | 0.8 | 1.3 |
| $CO_2$ | 14.2 | 13.9 | 10.2 |
| Carbon conversion (%) | 83.8 | 93.6 | 94.6 |
| Cold gas efficiency (%) | 61.7 | 69.3 | 72.8 |

Type of coal used: Taiheiyo Coal, particle size: 100 μm or less in 80 wt. %

In Table 1, the gasification efficiency is defined as follows:

$$\text{Carbon conversion (\%)} = \frac{\text{Gasified carbon amount (CO, CO}_2\text{, CH}_4\text{)}}{\left(\begin{array}{c}\text{Feed rate} \\ \text{of coal}\end{array}\right) \times \left(\begin{array}{c}\text{Carbon amount} \\ \text{in coal}\end{array}\right)} \times 100$$

$$\text{Cold gas efficiency (\%)} = \frac{\left(\begin{array}{c}\text{Heating value} \\ \text{of product gas}\end{array}\right) \times \left(\begin{array}{c}\text{Produced} \\ \text{amount} \\ \text{of gases}\end{array}\right)}{\left(\begin{array}{c}\text{Heating value} \\ \text{of coal}\end{array}\right) \times \left(\begin{array}{c}\text{Feed rate} \\ \text{of coal}\end{array}\right)} \times 100$$

For example, whe the carbon conversion is 94.6%, the remaining 5.4% carbon is contained in slag or flying dust. According to a conventional process, the remaining carbon content is so large that flying dust cannot be disposed as it is and is fed again to the gasifier. Examples 1 and 2 were conducted by using a gasifier of 20 kg.coal/hr, but the carbon conversion is as large as 94 to 95%. Since the heat loss rate from the gasifier becomes smaller with an increase of the scale of the gasifier, the temperature of the gasifier rises and the gasification reaction is accelerated, which results in further increasing the gasfication efficiency. Therefore, the recycle of the dust becomes unnecessary.

In Example 2, although the ratio of oxygen/coal in the lower burners was as large as 1.2 and the lower portion temperature was high, no damage on the gasifier walls was admitted due to the smaller rotational circle diameter of 0.3.

EXAMPLES 3 AND 4

In Example 3, South African Coal was used. The South African Coal is higher in the melting point of ash and lower in flowability of molten slag than the Taiheiyo Coal (produced in Hokkaido, Japan) listed in Table 1. The gasification of the South African Coal was conducted by using a different rotational circle diameter with narrowed outlet type gasifier as shown in FIG. 12 under the conditions as listed in Table 2. There was no trouble of slag solidification, which made it possible to continue the operation. This is because, as clearly shown in Table 2, the smaller rotational circle diameter of lower burners lessens a fear of gasifier wall damage and the oxygen/coal ratio can be enlarged to some extent, which results in making the temperature of center portion of the gasifier locally higher and making it possible to maintain the slag tap hole at high temperature necessary for flowing down the slag.

In Example 4, the gasification was conducted by using Australian Coal under the conditions as listed in Table 2. The results are as shown in Table 2.

|  | Example No. | |
| --- | --- | --- |
|  | Example 3 | Example 4 |
| Coal |  |  |
| Name | South African Coal | Australian Coal |
| Ash flowing point (oxydizing) (°C.) | 1590 | 1700 or higher |
| Rotational circle diameter / Gasifier diameter (m/m) |  |  |
| upper | 0.7 | 0.7 |
| lower | 0.3 | Single burner directed vertically upward |
| Coal feed rate (kg/hr) |  |  |
| upper | 10.0 | 10.0 |
| lower | 10.5 | 10.0 |
| Oxygen feed rate (kg/hr) |  |  |
| upper | 6.3 | 6.8 |
| lower | 14.8 | 14.2 |
| Carbon conversion (%) | 94.3 | 95.8 |
| Cold gas efficiency (%) | 65.8 | 67.2 |
| Slag tapping |  |  |
| Slag tap hole temperature (°C.) | 1630 | 1740 |
| Slag flow down state | Continuous flow down | Continuous flow down |

EXAMPLE 5

Figure 16:
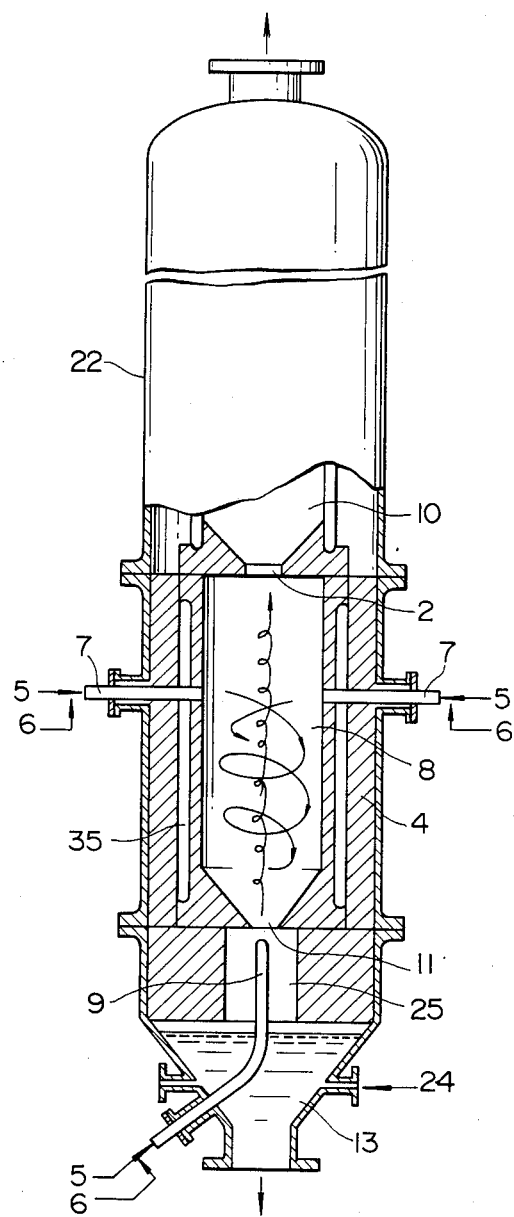
FIG. 16 is a lengthwise cross-sectional view of essential portions of another example of the gasifier of this invention.

Gasification was conducted by using a gasifier as shown in FIG. 16, which was different from that of FIG. 12 in the structure of lower burner and its arrangement. In this Example, there was used one lower burner 9 which injects coal vertically upward just over a slag tap hole 11 as shown in FIG. 16. In this case, the lower burner has such a structure as injecting coal and a gasifying agent while rotating. In this Example, the rotating circle diameter made by the lower burner 9 was narrowed as small as possible, that is, near the limit. Thus, the temperature for melting the coal ash was extremely high. This means that the structure of FIG. 16 is suitable for the case wherein the flow down of slag is difficult.

Figure 17:
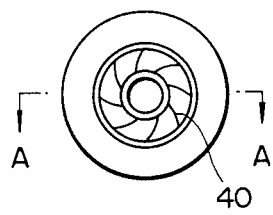
FIG. 17 is a plan view of an end portion of a lower burner installed in the gasifier of FIG. 16.
Figure 18:
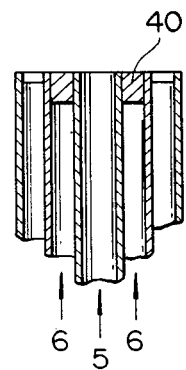
FIG. 18 is a cross-sectional view along the line A—A of FIG. 17.

The structure of lower burner 9 is as shown in FIGS. 17 and 18. The rotational flow can be provided to the burner flame by a plate 40 which gives a circumferential direction to a gasifying agent 6 and coal 5 injected from the burner. Since the number of lower burner is one in this Example, this structure is disadvantageous for enlargement compared with the gasifier as shown in FIG. 12, but is effective for enlarging the types of coal usable in entrained bed gasifiers.

As mentioned above, according to this invention, since the char produced by the reactions represented by the reaction formulae (1) and (3) from coal fed through the upper burners located at the upper portion of the gasification section falls down the gasification section while rotating, the char can contact with $H_2O$ and $CO_2$, which are produced by the reactions represented by the reaction formulae (2) and (4) from coal fed through the lower burner, with a sufficient contact time and in wide region, which results in accelerating the reaction and gasifying the char completely. Therefore, the gasifier of this invention is remarkably effective for improving the gasification efficiency of entrained bed gasifiers.

What is claimed is:

1. A coal gasifier comprising a continuously cylindrical gasification section free of internal structural members, means defining a gas outlet having a diameter which defines a cross-sectional area that is smaller than that of a horizontal cross-sectional area of the gasification section at an upper portion of the gasification section, means defining a slag tap hole at the bottom of the gasification section, at least two installed positions of feed burner means at different heights for reacting coal and a gasifying agent within said gasification section, an upper burner means being located at an upper portion from one-half of the height of the gasification section along the vertical direction, and a lower burner means being located at a lower portion from the one-half of the height of the gasification section, said burner means being located and constructed so that coal and a gasifying agent are injected together by a same burner of each burner means into the upper and the lower portions of the gasification section to create a rotational flow of coal and gasifying agent in each of said portions of the gasification section that travels in the same rotational direction, and the upper burner means and the lower burner means being located so that the rotational flow created by the upper burner means defines an upper rotating circle diameter that is 0.7 to 0.8 of the inner diameter of the gasifier and a lower rotating circle diameter created by the lower burner means that is 0.25 to 0.4 of the upper rotating circle diameter.

2. A coal gasifier according to claim 1, wherein the diameter of the gas outlet is almost the same as the rotating circle diameter formed by the lower burner means.

* * * * *